May 14, 1968     A. H. BOHR ET AL     3,382,626

RIGID PLATE TYPE EXTENSIBLE BOOM

Filed Oct. 19, 1965     2 Sheets-Sheet 1

INVENTORS
ALEXANDER H. BOHR
WALTER O. BORCHERDT
BY
AGENT

May 14, 1968     A. H. BOHR ET AL     3,382,626
RIGID PLATE TYPE EXTENSIBLE BOOM
Filed Oct. 19, 1965     2 Sheets-Sheet 2
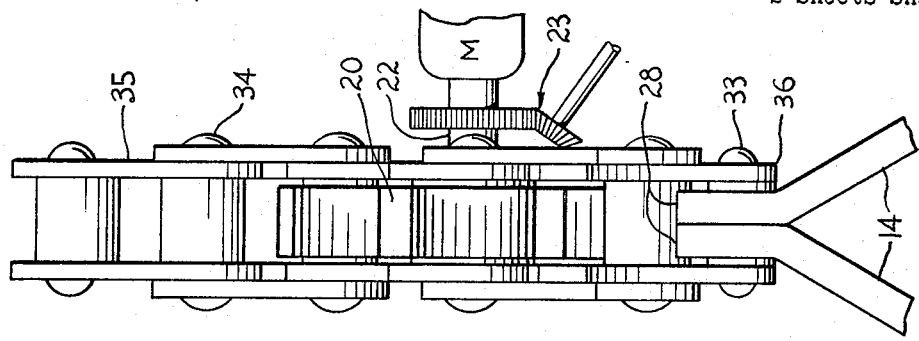
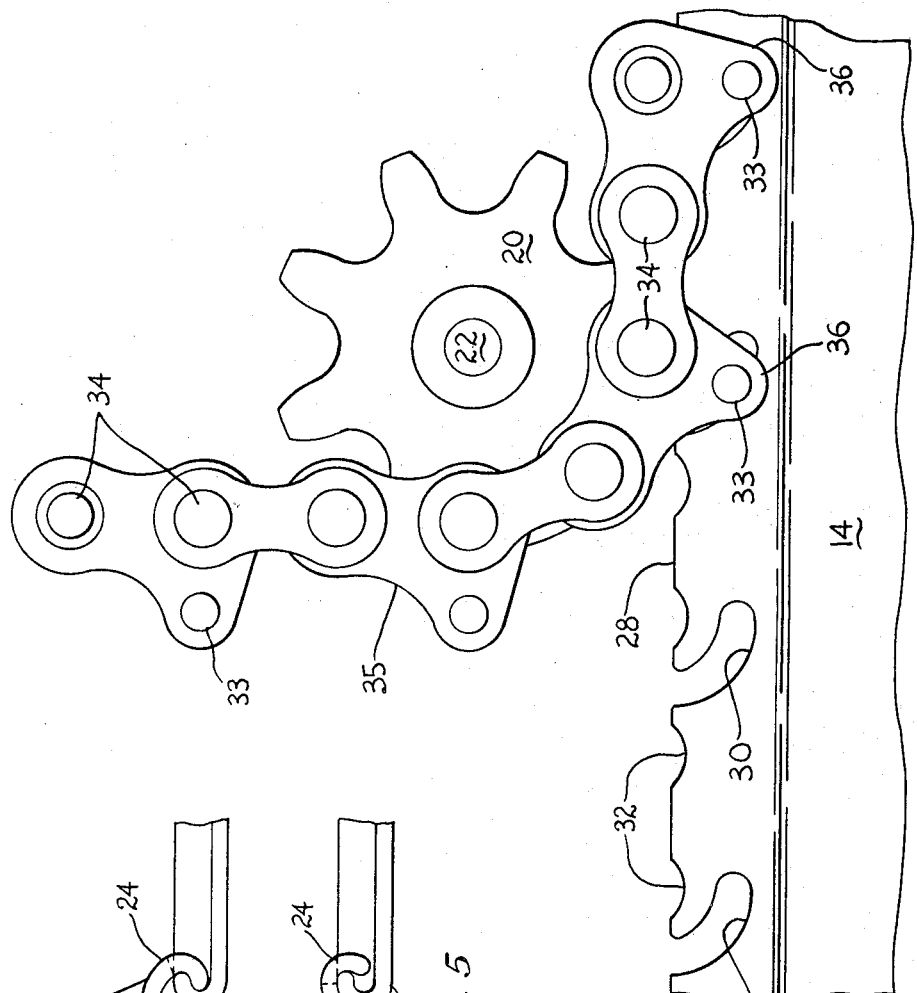
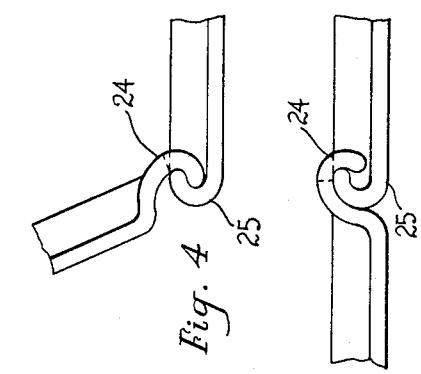
INVENTORS
ALEXANDER H. BOHR
WALTER O. BORCHERDT
BY
*AGENT*

United States Patent Office 3,382,626
Patented May 14, 1968

3,382,626
RIGID PLATE TYPE EXTENSIBLE BOOM
Alexander H. Bohr, Sparta, and Walter O. Borcherdt, Mountain Lakes, N.J., assignors to Thiokol Chemical Corporation, Bristol, Pa., a corporation of Delaware
Filed Oct. 19, 1965, Ser. No. 497,980
12 Claims. (Cl. 52—108)

This invention relates generally to extensible booms and more particularly to a compactly storage and transportable hollow boom formed from stacked strips which are extensible in the field to form triangular or other useful construction shapes to perform useful functions.

An extensible hollow boom of this general nature which is formed from stored coiled strips is disclosed in my co-pending application Ser. No. 209,357, filed July 12, 1962, now Patent No. 3,213,573 and is useful in many and varied applications such as foot and vehicle bridges, hoists, portable lifts, elevators, antennae towers, manipulators, grapnels, ladders, truck bodies, etc.

The coiling of the strips for storage during retraction of the boom of necessity imposes limitations on the materials employed both as to nature and as to dimensions and gauge employed because of long reach of the extended boom has to embody adequately engineered torque and moment capability.

The main object of the present invention is to provide an improved hollow extensible boom for use in varied applications which may be formed from separately stacked strips which are readily extensible and connectible in the field, and which will have a long reach and improved torque and moment capability.

An important object of the present invention is to provide an improved, rigid, hollow boom which may be automatically formed by joining a plurality of stored, separately stacked, rigid short strips or plates.

A further important object of the present invention is to provide an improved rigid hollow boom formed of stored separately stacked, rigid plates which may be automatically connected end to end to form strips and the formed strips connected side to side to form an extended triangular or other shaped boom.

Other objects and advantages of the invention will become apparent during the course of the following description.

The drawings show one embodiment of the invention. In this showing:

FIGURE 4 is a side elevational view to an enlarged scale of the ends of a pair of co-operating plates in position to be connected or disconnected, showing the configuration of their co-operating end portions;

FIGURE 5 is a similar view showing a pair of adjacent plates in straight extended position in which they are capable of transmitting tensile or compressive forces;

FIGURE 6 is a side elevational view showing the slots in the side edges of the rigid connectible plates, one of the driving sprockets, and the chain driven by the sprocket whose links engage the plate slots to connect the plates and to advance and retract them; and FIGURE 7 is a top plan view thereof.

Figure 1:
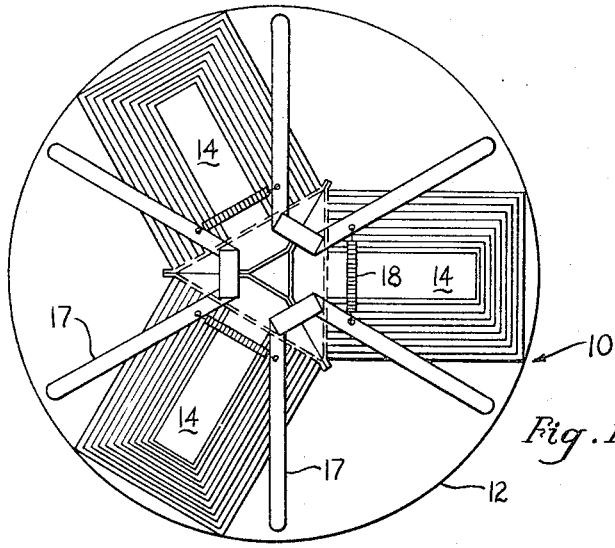
FIGURE 1 is a plan view of the stacked plate extensible boom structure and its erecting means, parts being omitted for clarity.

Referring to the drawings, numeral 10 designates the plate-type extensible boom structure as a whole which comprises a support 12 which may be fixed, or the bed of a vehicle, etc. By way of illustration only, FIGURES 1 to 3 disclose the rigid plates 14 and erecting A-frame elements 17 (except the power driven sprockets, etc.) necessary to produce a hollow, triangular boom or mast 16 one hundred feet tall which is tapered from a side dimension of two feet at its bottom to one to six inches at its top.

The individual plates 14 necessary to produce this tapered boom 16 are graduated in thickness so as to be ¼ inch thick at the bottom of the boom and 1/10 inch thick at its top. Similarly, while each of the plates 14 are thirty inches long, the plates in each stack are of increasingly greater width from the uppermost rigid plate in a stack to the lowermost.

Figure 2:
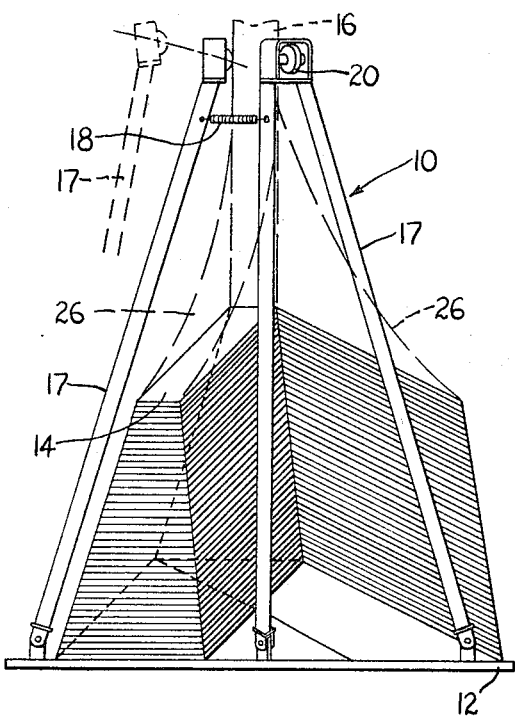
FIGURE 2 is a side elevational view thereof.
Figure 3:
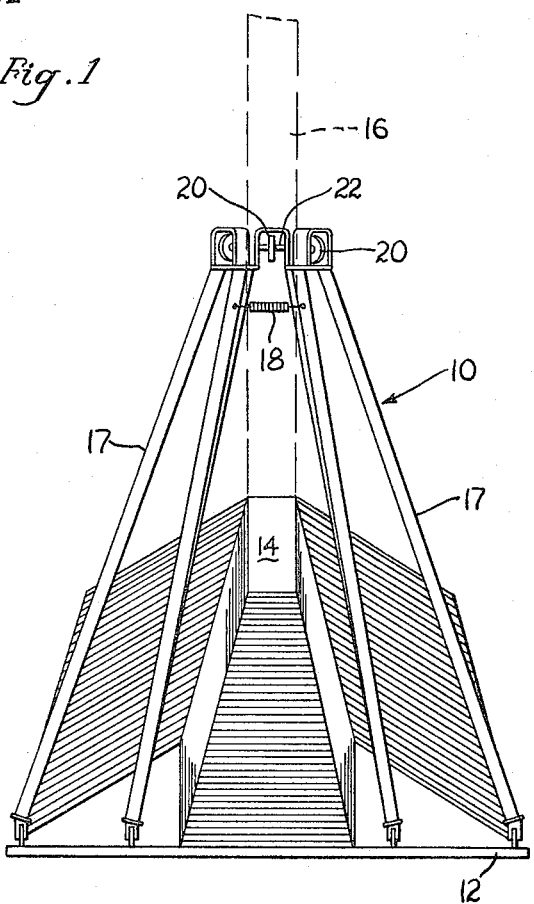
FIGURE 3 is a similar view taken at an angle of 30° with respect thereto.

As shown in FIGURES 1 to 3, the erecting mechanism includes a plurality of A-frames 17 angularly disposed at 60° with respect to each other and pivotally mounted on the support 12. The A-frames are resiliently connected to each other by suitable means such as strong springs 18 so as to synchronize their radial movement inwardly and outwardly during retraction and extension of the boom due to the taper of the plate widths. This ensures that the engaging and actuating sprockets to be described are always properly positioned with respect to the vertically spaced joints between the plates.

Each of the A-frames 17 carries a sprocket 20 (FIGURES 6 and 7) mounted on a shaft 22 which are adapted to be synchronously driven by a motor M through universal-shaft-mounted gears as is schematically indicated at 23 in FIGURE 7. The rigid plates are arranged in three stacks of forty plates each, all inclined as indicated in FIGURES 2 and 3 so that their surfaces are at an angle of 30° to the horizontal.

The opposite ends of each plate 14 are rolled (FIGURES 4 and 5) to provide co-operatively engaging hook edges 24, 25. During erection, as the upper end of each set of plates 14 is raised (as will be explained) vertically into its proper position in the growing pyramid or boom, the lower end slides up the surface of the plate below it and finally engages the hooks 24, 25 which interconnect the plates 14. The plates continue to rise and the next lower plates go through the same motions.

The dash lines 26 (FIGURE 2) indicate the path of the top plates of the stacks as they are erected into the mast or boom being formed, these paths moving down as the plates are successively removed from the stacks until the bottom plate of each stack is reached. The lower ends of the bottom plates are hinged to the support 12 and act to transfer the working stresses of the erected boom 16 into the support 12. The boom is additionally braced by the engaging sprockets 20 and the A-frame 17 at an elevation above the base of slightly more than two plate lengths.

As illustrated in FIGURES 6 and 7, each of the side edges 28 of the rigid plates 14 is provided with curved slots 30 and notches 32 for the respective reception of and engagement by the actuating pin 33 and link connecting pins 34 of a special chain 35 which is provided for each of the adjacent pairs of plate edges 28 of the rigid plates 14 and driven by the sprockets 20, the balance of the length of the chains being suitably stored on the support 12.

It is to be noted that every other one of the links of the chain 35 is provided with offset portions 36 which not only support the actuating pins 33 but also clamp the adjacent side edges of two co-extensive rigid plates together to rigidly unite the strips formed by the extension of the rigid plates in each pile to form each of the three strips.

It will be appreciated that the three chains 35 are held against the edges of the plates 14 by the sprockets 20 and are locked to the plates by virtue of the co-operation between the slots 30 and notches 32 and the link pins 33, 34. The chain thus hold the strips formed by the extended plates in rigid alignment so that the extended boom portion 16 resists shear and separating forces and also serve as racks by means of which the chain sprockets 20 may continuously extend or retract the structure.

In the erection of the boom, before the end-to-end hooked connection of a pair of plates 14 reaches a sprocket 20, the two plates are in line as shown in FIGURE 5, locked together, and capable of transmitting tensile and compressive forces as the plates cannot pivot downwardly with respect to each other due to the hook end connections 24, 25, but only upwardly as indicated in FIGURE 4. The plates may be formed of metal, plastic, etc. and if of plastic, the erected boom is, of course, insulated by virtue of the material itself.

It is believed to be apparent that during retraction of the boom 16, the strips and the interlocked plates 14 forming the strips are released by the chain and from each other with the various movements proceeding in reverse order so that the plates are restacked in the three piles on the support 12 except for the uppermost plates which remain engaged by the chain 35. Under some circumstances and especially where the boom 16 is being extended or retracted horizontally or with a large horizontal component, additional plate and stacking guides are provided to take the place of gravity forces which are utilized as described herein.

It is to be understood that the form of our invention herewith shown and described is to be taken as a preferred example of the same and that various changes in the shape, size and arrangement of parts may be resorted to without departure from the spirit of the invention or the scope of the subjoined claims.

We claim:
1. An extensible member for use as a boom comprising, in combination, a plurality of rigid interconnectible plates extended from a storage stack into connection to form a strip, additional strips extended from separate stacks coextensively with and adjacent to said first strip, and separate means coextensive with and connecting the edges of said strips to form a rigid hollow boom.

2. The combination recited in claim 1 wherein said plates are retractable to storage position on said stacks to shorten the length of said boom.

3. The combination recited in claim 1 wherein slots are formed in the edges of said plates, and said means comprises chains having links positioned in said slots.

4. The combination recited in claim 3 wherein each of said chains is stored on a sprocked positioned between each pair of said storage stacks.

5. The combination recited in claim 4 wherein the outer end of each of said chains is connected to the uppermost plate of each of said stacks, and means for simultaneously driving said sprockets to extend or retract said plates.

6. An extensible member for use as a boom, etc. comprising, in combination, a plurality of separate strips, and means for simultaneously moving said strips into edge to edge relationship with each other and clamping them throughout their lengths in such relationship to form a hollow rigid structure.

7. The combination recited in claim 6 wherein each of said strips is formed by a plurality of rigid plates having interlocking ends.

8. The combination recited in claim 6 wherein said strips are provided with slots in their lateral edges, and said means include chains having links adapted to movably engage said slots and clamp together said edges.

9. The combination recited in claim 8 wherein each of said chains is actuated by an engaging sprocket positioned between said strips, and power means for simultaneously driving said sprockets to extend or retract said strips.

10. An extensible member for use as a boom, etc., comprising, in combination, a support, a plurality of piles of connectible plates mounted on said support, means for moving said plates into connected relationship to form a strip of plates from each pile, and means for moving each of said strips into edge to edge relationship with each other and clamping them throughout their lengths in such relationship to form a hollow rigid structure.

11. The combination recited in claim 10 wherein the plates of each strip include slots in their lateral edges, and said means include chains having links adapted to movably engage said slots and clamp said edges together.

12. The combination recited in claim 11 wherein each of said chains is actuated by an engaging sprocket positioned between said strips, and power means for simultaneously driving said sprockets to extend or retract said strips.

References Cited

UNITED STATES PATENTS

| | | | |
|---|---|---|---|
| 2,130,993 | 9/1938 | Dubilier | 52—108 |
| 3,213,573 | 10/1965 | Bohr et al. | 52—108 |
| 3,319,587 | 5/1967 | Bohr et al. | 52—108 |

FOREIGN PATENTS

| | | |
|---|---|---|
| 3,942 | 8/1909 | Great Britain. |
| 20,059 | 7/1909 | Norway. |

HENRY C. SUTHERLAND, *Primary Examiner.*

JAMES L. RIDGILL, JR., *Examiner.*

UNITED STATES PATENT OFFICE
CERTIFICATE OF CORRECTION

Patent No. 3,382,626  
May 14, 1968

Alexander H. Bohr et al.

It is certified that error appears in the above identified patent and that said Letters Patent are hereby corrected as shown below:

Column 1, line 10, "storage" should read -- storable --.
Column 3, line 48, "sprocked" should read -- sprocket --.

Signed and sealed this 23rd day of September 1969.

(SEAL)  
Attest:

Edward M. Fletcher, Jr.  
Attesting Officer

WILLIAM E. SCHUYLER, JR.  
Commissioner of Patents